Figure 1:
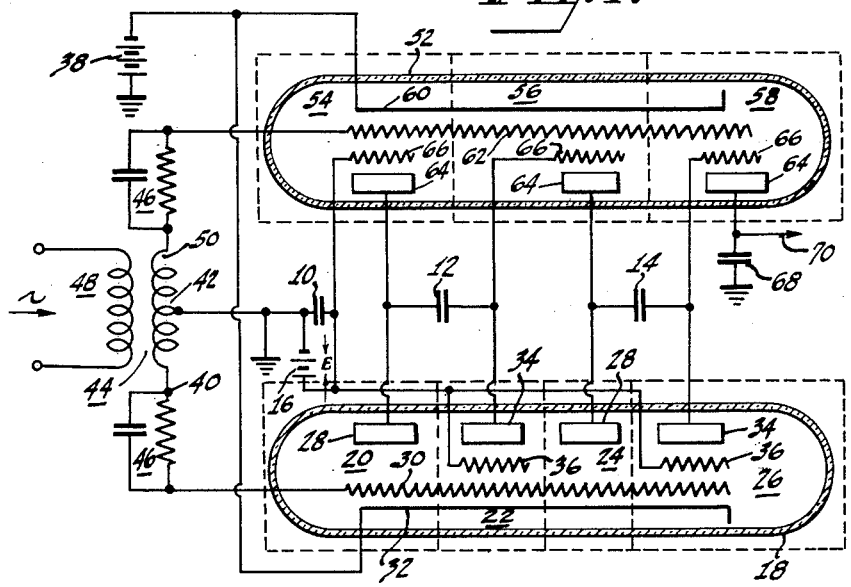

April 18, 1950 L. J. GIACOLETTO 2,504,321
VOLTAGE TRANSFER NETWORK
Filed Dec. 23, 1948 2 Sheets-Sheet 1

INVENTOR
LAWRENCE J. GIACOLETTO
BY
ATTORNEY

April 18, 1950 L. J. GIACOLETTO 2,504,321
VOLTAGE TRANSFER NETWORK

Filed Dec. 23, 1948 2 Sheets-Sheet 2

INVENTOR
LAWRENCE J. GIACOLETTO
BY
ATTORNEY

Patented Apr. 18, 1950

2,504,321

UNITED STATES PATENT OFFICE 2,504,321

VOLTAGE TRANSFER NETWORK

Lawrence J. Giacoletto, Eatontown, N. J., assignor to Radio Corporation of America, a corporation of Delaware Application December 23, 1948, Serial No. 67,053

11 Claims. (Cl. 171—97)

This invention relates to improvements in electrical networks, and more particularly to improved electrical voltage multiplier networks for charging a plurality of capacitors in parallel and for reconnecting the capacitors in series, electronically, in order to obtain the sum of the individual capacitor voltages.

A known method of obtaining voltage multiplication involves charging a plurality of capacitors in parallel, and then reconnecting the capacitors in series, to obtain a total voltage equal to the sum of the individual capacitor voltages. Conventional arrangements of the foregoing type usually involve mechanical switching arrangements and are subject to inherent mechanical limitations. For example, the switching frequency is limited to a fairly low rate due to the inertia of the mechanical switch elements. In order to obtain an appreciable output current with capacitors of ordinary size, it is necessary that a relatively high switching rate be used, and it has been found that the switching rates obtainable with ordinary mechanical switches fall considerably below the desired energy-transfer rate in many instances. Low rate mechanical switching also introduces, in the output voltage, undesirable low frequency "ripples" which must be removed by complicated and expensive filtering networks.

It is, accordingly, an object of my invention to provide an improved switching system for voltage transfer and/or voltage multiplication networks.

Another object of my invention is to provide an improved electrical network for alternately connecting capacitors in series and in parallel.

A further object of my invention is to provide a switching system, actuated by electron bombardment, for voltage transfer and/or voltage multiplication networks.

According to my invention, the foregoing and other objects and advantages are obtained by connecting a plurality of capacitors in a network comprising a parallel circuit and a series circuit, each of the circuits having normally nonconductive portions including an element adapted to render the non-conductive portions conductive when the element is subjected to electron bombardment. As will be brought out more fully hereinafter, the use of electron bombardment to induce conductivity permits effective isolation of those portions of the network which are connected to a source of charging voltage, thus simplifying the voltage isolation problems ordinarily encountered in this type of network.

Figure 2:
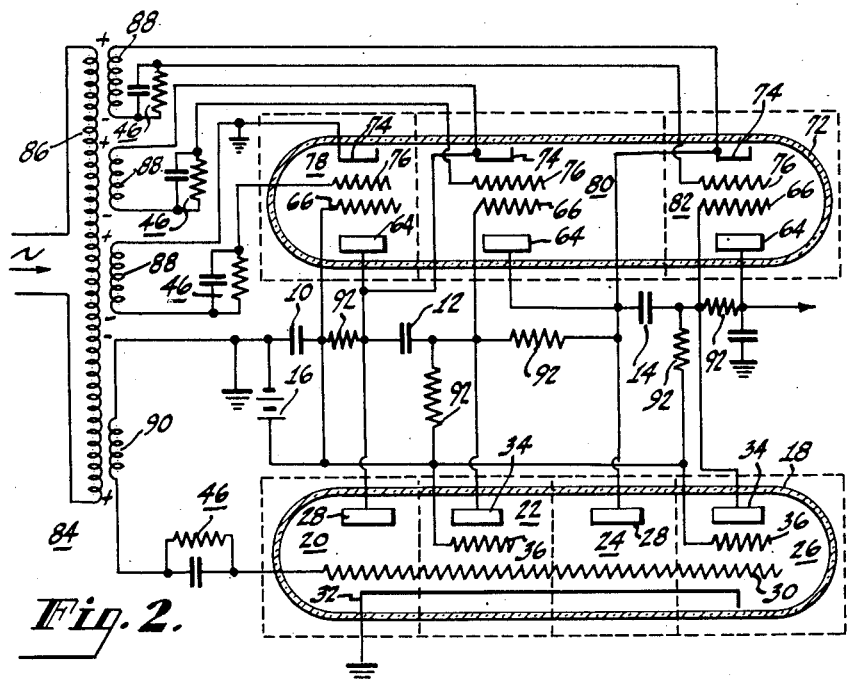
Figure 3:
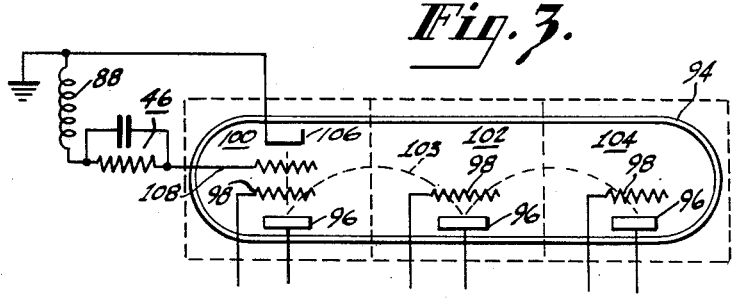
Figure 4:
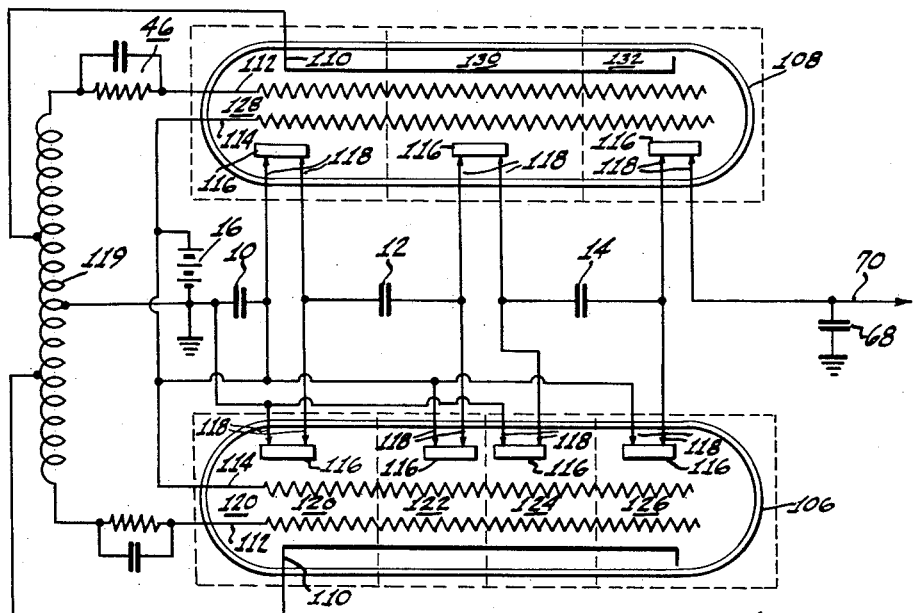

A more complete understanding of the invention may be had by reference to the following description of illustrative embodiments thereof, when considered in connection with the accompanying drawings in which:

Figure 1 is a schematic diagram of a voltage multiplication network arranged in accordance with one form of my invention, Figure 2 is a schematic diagram of a modified form of the network shown in Figure 1, Figure 3 is a schematic diagram of a tube which may be substituted for one of the tubes in the network of Figure 2, and Figure 4 is a schematic diagram of a network embodying a further possible modification according to my invention.

In the network shown in Figure 1, three capacitors 10, 12, 14 are to be charged to the same voltage, E, by connecting the three capacitors in parallel with a source of voltage, such as a battery 16. The three capacitors are then to be connected in series in order to obtain an output of 3E volts therefrom. Considering, first, the problem of charging the capacitors, it will be seen that the first capacitor 10 is connected to ground and to the source of charging voltage 16, while the ungrounded capacitors 14, 16 are connected in circuit with a multi-electrode vacuum tube 18.

The tube 18 has four sections 20, 22, 24, 26, all contained within a single evacuated envelope. The first and third sections 20, 24 of the tube 18 correspond, in general, to triode vacuum tubes and have separate anodes 28, a common control grid 30, and a common cathode electrode 32. The second and fourth sections 22, 26 of the tube 18 comprise "secondary emitter" sections and have dynode electrodes 34 and collector electrodes 36, as well as the common grid and cathode electrodes 30, 32 which serve the first and third sections 20, 24 of the tube 18. It will be understood that the dynode electrodes 34 are constituted of material which will emit "secondary" electrons when bombarded by a stream of primary electrons from the cathode 32. As is well known, the number of secondary electrons emitted by a dynode 34 for each primary electron from the cathode 32 will depend upon the velocity of the primary electron, and upon the nature of the material of which the dynodes 34 are made. In the present case, the dynode electrodes 34 should be constituted of materials, such as copper beryllium or silver magnesium, which are capable of furnishing a ratio of secondary to primary electrons greater than one.

The collector electrodes 36 are connected to the charging voltage source 16, while the dynodes 34 are each connected to one side of one of the ungrounded capacitors 12, 14. As will appear more fully hereinafter, the secondary emitter stages 22, 26 of the tube 18 require the application of a small "starting" voltage between the cathode 32 and the dynodes 34, and to this end the cathode 32 is returned to ground through a "starting" voltage source, such as a battery 38. The control grid 30 of the tube 18 is connected to one terminal 40 of a secondary winding 42 of a transformer 44 through a self-bias network 46.

In the network of Figure 1, as thus far described, when an A. C. signal is applied to the primary winding 48 of the transformer 44, the voltages at the terminals 40, 50 of the secondary winding 42 of the transformer will alternate between positive and negative values in the usual manner. When the grid 30 of the tube 18 becomes positive, primary current will flow in all sections 20, 22, 24, 26 of the tube 18 due to the negative "starting" voltage on the cathode 32. Current flow in the first and third stages 20, 24 of the tube 18 will effectively connect one side of each of the capacitors 12, 14 to ground through the bias battery 38. At the same time, the dynodes 34 of the tube 18 will be bombarded by primary electrons from the cathode 32, causing the dynodes 34 to emit secondary electrons which will be attracted to the collector electrodes 36 by virtue of the positive voltage thereon. The capacitors 12 and 14 will become charged approximately to the voltage E on the collector electrodes 36 due to secondary current flow from the dynodes 34 to the collector electrodes 36. Hence, each time that the control grid 30 of the tube 18 becomes positive, the normally nonconductive portions of the circuit (between the collectors 36 and the dynodes 34) will be rendered conductive due to electron bombardment of the dynodes 34, effectively connecting the capacitors 12, 14 in parallel with the charging voltage source 16. The tube 18 serves to connect all of the capacitors 10, 12, 14 in parallel due to the foregoing action, and will be referred to hereinafter as the "parallel" tube.

A second tube 52 which is provided in the network of Figure 1 has three sections 54, 56, 58, each of which corresponds to the second and fourth sections 22, 26 of the tube 18 previously described, including a common cathode 60 and control grid 62, as well as dynodes 64 and collectors 66. The control grid 62 of the second tube 52 is connected to the terminal 50 of the secondary winding 42 of the transformer 44, so that the control grid 60 of the second tube 52 will alternately become positive and negative 180° out of phase with the grid 30 of the parallel tube 18.

Assuming that each of the capacitors 10, 12, 14 have acquired a charge approximately equal to the voltage, E, of the source 16, when the second tube 52 is turned on by a positive half cycle of voltage at the terminal 50 of the transformer 44, the primary electron stream in the first section 54 of the tube 52 will cause the dynode electrode 64 thereof to emit secondary electrons, which will flow to the collector electrode 66 in the first tube section 54, thus effectively connecting the capacitors 10 and 12 in series. A similar action will take place simultaneously in the second section 56 of the tube 52, so that the three capacitors 10, 12 and 14 will be connected effectively in series. In view of the foregoing the tube 52 will be referred to hereinafter as the "series" tube.

The total voltage on the collector electrode 66 in the last section 58 of the tube 52 will be approximately equal to three times the voltage of the source 16, or 3E. By an action in the last section 58 of the tube 52 similar to that in the first two sections 54 and 56, the voltage 3E will appear on the dynode 64 in the last section 58 of the tube 52, so that an output condenser 68 connected to the dynode 64 in the last section 58 of the tube 52 will become charged approximately to a voltage 3E. As the polarity of the voltage on the grids 30, 62 of the two tubes 18, 52 alternately changes, the foregoing action will be repeated, and the output capacitor 68 will receive energy periodically at the previously specified level, 3E. It will be appreciated that the frequency of the foregoing switching action can be considerably greater than would be the case if conventional mechanical switches were used, and accordingly, a relatively large output current, at high voltage, and with little ripple, will be made available on an output lead 70.

While the network shown in Figure 1 is adequate for many purposes, the use of a single cathode element 60 in the tube 52 introduces a limitation when extremely high output voltages are involved. It is known that most of the materials used for dynode electrodes have a ratio of secondary to primary electrons which increases with increasing energy of the primary electrons up to a certain point above which the ratio of secondary to primary electrons decreases, eventually dropping below one at the so-called "second cross-over point." Since the common cathode 60 of the second tube 52 of the network of Figure 1 is at a fixed potential, while the voltage on the collector electrodes 66 in each of the sections 54, 56, 58 of the tube 52 increases progressively from the first section 54 to the last section 58, it is possible that the energy of the primary electrons in the higher-voltage sections of the tube 52 may be above the second cross-over point. Accordingly, where high output voltages are desired, dynode materials having a high-energy second cross-over point should be used in the tube 52 in Figure 1. However, if the output voltage desired would raise the energy of the primary electrons above the second cross-over point of available dynode materials, the problem may be avoided by placing the dynodes 64 at a small angle with respect to the direction of motion of the primary electrons. This will serve to decrease the component of primary electron velocity normal to the dynode surface, thus reducing the amount of effective energy with which the primary electrons strike the dynode. The "second cross-over" problem can also be avoided by use of the circuit modification shown in Figure 2.

In the network of Figure 2, the "parallel" tube 18 is identical to the parallel tube 18 in the circuit of Figure 1, while the "series" tube 72 in Figure 2, corresponding to the series tube 52 in Figure 1, is provided with individual cathodes and control grids 74, 76 in each of the sections 78, 80, 82, thereof. The dynode electrode 66 in the first section 78 of the tube 72 is connected to the cathode electrode 74 in the second section 80, while the dynode 66 in the second section 80 of the tube 72 is connected to the cathode 74 in the third section 82, so that the operating voltage across any one section, say the section 82, of the tube 72 will be no greater than the voltage across any other section of the tube. A transformer 84, having a primary winding 86, and four individual secondary windings 88, 90, is provided in the network of Figure 2, with the secondary windings 88, 90 being arranged with relative polarities as indicated by the plus (+) and minus (—) signs in the drawing.

As was previously mentioned, it is necessary to have a slight difference in potential between the cathodes 32, 74 and the dynodes 34, 66 in the tubes 18, 72 in order to initiate primary electron current flow therein. In the series tube 72 of the circuit of Figure 2, the cathode circuits for the second and third sections 80, 82 are not returned directly to ground, and are, therefore, effectively isolated from their respective dynode and collector electrode circuits (in the absence of current flow in the tube). Hence, it is not feasible to use a starting voltage arrangement of the type used in the network of Figure 1. In the network of Figure 2, starting voltage is obtained by connecting the dynode electrodes 64 to the charging voltage source 16 through large resistors 92, which are preferably of the order of several megohms. As is shown in the drawing, the same expedient can be used for both of the tubes 18, 72, thus completely eliminating the starting voltage source 38 utilized in the network of Figure 1. In the case of the parallel tube 18 in Figure 2, when the tube 18 is turned on by a voltage of the proper polarity at the grid 30, each of the dynode electrodes 34 will have a small positive voltage thereon (derived from the charging voltage source 16), sufficient to initiate the flow of primary electron current in the tube 18. Similarly, in the series tube 72, the voltage on the dynode electrodes 64, obtained through the resistors 92, will be sufficient to initiate primary electron current flow in the tube 72. Once the flow of primary current has been started in either of the tubes 18, 72, the resistors 92 associated therewith will be shorted by the low resistance paths between the collectors 36 and the dynodes 34, or between the collectors 66 and the dynodes 64, as the case may be. The resistors 92 are utilized only to initiate primary electron current flow in the tubes 18, 72, and do not materially affect the network thereafter.

Although the use of individual cathode electrodes 74 in the series tube 72 of the network of Figure 2 eliminates the "second cross over" problem, as was described, each of the cathodes in the second and third sections 80, 82 of the tube 72 will be operated above ground potential, thereby introducing a tube heater insulation problem. Moreover, separate inputs are required for each of the grid-to-cathode circuits of the tube 72. Figure 3 is a schematic diagram of a tube 94 which can be used in place of the tube 72 in the network of Figure 2, to eliminate the separate input and heater insulation problems just mentioned.

The tube 94 in Figure 3 is provided with a dynode electrode 96 and a collector electrode 98 in each of the three sections 100, 102, 104, thereof, but has only a single cathode 106 and a single grid 108, located in the first section 100 of the tube. The dynode electrodes 96 in the first and second sections 100, 102 of the tube 94 serve as "cathodes" for the dynode electrodes 96 in the second and third sections 102, 104 of the tube, respectively. When the tube 94 is turned on, by a positive voltage at the grid 108 thereof, primary electrons from the cathode 106 will strike the dynode 96 in the first section 100, causing secondary electrons to be emitted therefrom. Most of the secondary electrons from the dynode 96 in the first section 100 will be collected by the collector grid 98 in the same section 100 of the tube 94. However, a few of the secondary electrons from the dynode 96 in the first section 100 will pass through the collector electrode 98 and may be directed along the path of the dotted line 103 onto the dynode 96 in the second section of the tube, by means of magnetic (or electrostatic) focusing means (not shown) such as are well known in the art. It will be understood that a magnetic field perpendicular to the plane of the paper, or an electrostatic field parallel to the plane of the paper, can be utilized to achieve the desired result. In the second section 102 of the tube 94, secondary electrons from the dynode 96 will be partly collected by the collector 98, while some of the electrons will be passed on to the dynode 96 in the third section 104 of the tube. Thus, the secondary electron streams in each of the sections 100, 102, 104 of the tube 94 will form conducting paths between the dynode and collector electrodes 96, 98, while each of the dynodes 96 will serve as a "cathode," or source of bombarding electrons, for the next succeeding section. By substituting the tube 94 shown in Figure 3, for the tube 72 in the network of Figure 2, the insulation and separate input problems mentioned in connection with the explanation of the network of Figure 2 will be eliminated, while very high output voltages may be obtained.

In Figure 4, a further modification of the invention is shown, wherein the normally non-conducting spaces within each of the tube sections of Figures 1, 2 and 3 have been replaced with normally nonconductive elements which may be rendered conductive by electron bombardment.

It has been found (see Bulletin of the American Physical Society, volume 22, No. 3, and vol. 23, No. 2; Electronics, vol. 20, No. 12, page 144) that certain substances, such as diamond, quartz, and the like, which are normally non-conductive (i. e. good insulators) can be rendered conductive by bombardment thereof with electrons, ions, or other elemental electrical particles. Such substances will be referred to hereinafter and in the appended claims as insulator-conductors.

In the network of Figure 4, a parallel tube 106 and a series tube 108 each comprise a cathode 110, a control grid 112, an accelerating grid 114, and a plurality of insulator-conductor elements 116, each of which has two electrodes 118 contacting the surface thereof. The cathodes 110, control grids 112, and accelerating grids 114 of the two tubes 106, 108 have a dual function in the network of Figure 4. First, the electrodes 110, 112, and 114 serve as cathode, grid, and "plate" electrodes in an ordinary two-tube, push-pull type of oscillatory circuit, wherein a coil 119 provides the necessary feedback coupling between the "plates" (accelerating grids 114) and control grids 112 to sustain oscillations between the tubes 106, 108, thereby setting up an alternating voltage at the control grids 112 of the two tubes 106, 108. Second, the cathodes 110, under the control of the grids 112, serve as sources of bombarding electrons, which will pass through the accelerating grids 114 and strike the insulator-conductor elements 116.

The parallel tube 106 in Figure 4 comprises four sections 120, 122, 124, and 126, which correspond functionally to the four sections 20, 22, 24, and 26, respectively, of the parallel tube 18 in the circuit of Figure 1. One of the contact electrodes 118 in each of the first and third sections 120, 124 of the parallel tube 106 is connected to ground, while the other contact electrode 118 in each of the first and third sections 120, 124 is connected to one side of the two ungrounded capacitors 12, 14. One of the contact electrodes 118 in each of the second and fourth sections 122, 126 of the tube 106 is connected to the high side of the charging voltage source 16, while the other contact electrode 118 in each of the second and fourth sections 122, 126 is connected to the other side of the ungrounded capacitors 12, 14. Thus, the three capacitors 10, 12, 14 are effectively connected in parallel through a circuit which includes the insulator-conductor elements 116 in the parallel tube 106.

The tube 108 comprises three sections 128, 130 and 132, which correspond functionally to the three sections 54, 56, and 58, respectively, of the series tube 52 in the network of Figure 1. The three capacitors 10, 12, 14 are effectively connected in series through a circuit which includes the insulator-conductor elements 116 in the series tube 108 in Figure 4.

The operation of the network of Figure 4 should now be apparent in view of the previous explanation of the networks of Figures 1 and 2. When any one of the insulator-conductors 116 is bombarded by primary electrons, inducing conductivity therein, a circuit will be completed between the two contact electrodes 118 associated therewith. When electrons from the cathode 110 of the parallel tube 106 bombard the elements 116 therein, each of the capacitors 10, 12, 14 will be effectively connected in parallel with the charging voltage source 16. On the other hand, when the series tube 108 is turned on, the capacitors 10, 12, 14 will be connected in series through the insulator-conductor elements 116 in the series tube.

In the network shown in Figure 4, it is possible for the elements 116 to acquire a negative charge, due to accumulation of bombarding electrons on the surface of the elements 116, sufficient to "block" or stop the bombarding electrons from the cathodes 110. If the elements 116 act as secondary emitters, having an emissivity ratio greater than one, secondary electrons from the elements 116 will be collected by the accelerating grids 114 so that the surface potential of the elements 116 will never become positive with respect to the cathodes 110, thus preventing the blocking effect mentioned above. If the elements 116 do not act as secondary emitters, the problem can be avoided by applying a metallic coating, sufficiently thin to allow bombarding particles to pass therethrough, to that surface of the elements 116 (on the side opposite to the contact electrodes 118) which is subject to bombardment. The metallic coating can then be connected to a source of positive voltage, such as the charging source 16, so that bombarding electrons, which might otherwise accumulate on the surface of the elements 116, will be removed as rapidly as they arrive at the elements 116.

It is important to note that the various high-voltage problems mentioned in connection with the networks of Figures 1 and 2 will not arise in the network of Figure 4, because the accelerating grids 114, which control the effective energy of bombarding electrons from the cathodes 110, will always be maintained at the same potential with respect to the cathode in each tube section. Moreover, the network of Figure 4 does not require an external A. C. switching voltage. Accordingly, the network of Figure 4 is deemed preferable for very high voltage applications.

In the foregoing networks, it will be understood that individual tubes can be used for each of the tube-sections referred to herein (with the exception of the tube shown in Figure 3), although it is deemed preferable from the standpoint of economy to combine the various electrodes in single envelopes as shown. It will also be apparent that the invention is not limited to three-capacitor circuits, which have been shown for the sake of simplicity, as any number of capacitors can be alternately charged in parallel and discharged in series in the foregoing manner by utilizing the necessary number of tubes or tube sections. Moreover, any or all of the foregoing circuits can be used for current multiplication by applying a high voltage across the capacitors 10, 12, 14 in series, and discharging the capacitors in parallel.

It should also be noted that the invention is not limited to the use of D. C. charging voltage for the capacitors 10, 12, 14, since an A. C. charging voltage, properly phased with respect to the A. C. switching voltage, could as well be used. Furthermore, the methods and apparatus disclosed herein can be used to amplify A. C. voltages by arrangements of the type shown in Thorp Patent 1,559,666, if desired.

Since these and many similar changes could be made in the networks shown and described, all within the scope and spirit of the invention, the foregoing is to be construed as illustrative and not in a limiting sense.

What is claimed is:

1. A voltage multiplier network comprising, a source of voltage, a plurality of capacitors, first circuit means for connecting said capacitors in parallel with said source, second circuit means for connecting said capacitors in series with said source, each of said circuit means having a normally non-conductive portion including an element adapted to render said nonconductive portion conductive upon subjecting said element to bombardment by elemental electrical particles, and means for selectively bombarding said first and said second circuit-portion elements with elemental electrical particles.

2. An electrical network comprising, in combination, a plurality of capacitors, a first circuit wherein said capacitors are connected in parallel, a second circuit wherein said capacitors are connected in series, each of said circuits having a normally non-conductive portion including an element adapted to render said non-conductive portion conductive upon subjecting said element to electron bombardment, and means for selectively bombarding said first and said second circuit-portion elements with electrons.

3. A voltage multiplier network comprising, in combination, a source of voltage, a plurality of capacitors, a first circuit wherein said capacitors are connected in parallel with said source, a second circuit wherein said capacitors are connected in series with said source, each of said circuits having a normally non-conductive portion including an element adapted to render said non-conductive portion conductive upon subjecting said element to electron bombardment, and means for selectively bombarding said first and said second circuit-portion elements with electrons.

4. A network as defined in claim 1, wherein said first circuit means comprises vacuum tube means including secondary emitters and wherein said second circuit means comprises vacuum tube means including secondary emitters.

5. A network as defined in claim 3, wherein said first circuit means comprises vacuum tube means including secondary emitters and wherein said second circuit means comprises vacuum tube means including secondary emitters.

6. A network as defined in claim 1, wherein said elements comprise insulator-conductor elements adapted to be rendered conductive by bombardment with elemental electrical particles.

7. A network as defined in claim 3, wherein said elements comprise insulator-conductor elements adapted to be rendered conductive by bombardment with elemental electrical particles.

8. A voltage multiplier network comprising, a plurality of capacitors, a source of charging voltage for said capacitors, a parallel charging circuit for said capacitors, said charging circuit including a first vacuum tube having (1) a cathode, (2) a control grid, (3) a plurality of anode electrodes, (4) a plurality of dynode electrodes, and (5) a collector electrode for each of said dynode electrodes, said source of voltage being connected between all of said collector electrodes and said cathode, each of said dynode electrodes being connected to one side of one of said capacitors, each of said anode electrodes being connected to the other side of one of said capacitors, a series discharging circuit for said capacitors, said series circuit including a second vacuum tube having (1) a cathode, (2) a control grid, (3) a plurality of dynode electrodes, and (4) a collector electrode for each of said dynode electrodes, said second tube cathode electrode being connected effectively to the low voltage side of said source of voltage, each of said second-tube collector electrodes being connected to one side of one of said capacitors, each but one of said second-tube dynode electrodes being connected to the other side of one of said capacitors, the arrangement being such that the flow of secondary electrons between the dynodes and the collector electrodes of said second tube will effectively connect said capacitors in series, and means for supplying in alternating voltage to said control grids of said first and second tubes in phase opposition.

9. A network as defined in claim 6, wherein said cathode of said second tube is a source of electrons for bombarding one of said dynode electrodes, and wherein said one dynode is a source of electrons for bombarding another of said dynodes.

10. A voltage multiplier network comprising, a plurality of capacitors, a source of charging voltage for said capacitors, a parallel charging circuit for said capacitors, said charging circuit including a first vacuum tube having (1) a cathode, (2) a control grid, (3) a plurality of anode electrodes, (4) a plurality of dynode electrodes, and (5) a collector electrode for each of said dynode electrodes, said source of voltage being connected between all of said collector electrodes and said cathode, each of said dynode electrodes being connected to one side of one of said capacitors, each of said anode electrodes being connected to the other side of one of said capacitors, a series discharging circuit for said capacitors, said series circuit including a second vacuum tube having (1) a plurality of dynode electrodes, (2) a collector electrode for each of said dynode electrodes, (3) a control grid for each of said dynode electrodes, and (4) a cathode for each of said dynode electrodes, one of said second tube cathode electrodes being connected effectively to the low voltage side of said source of voltage, each of the other second-tube cathode electrodes being connected to one of said dynode electrodes, said one second-tube cathode electrode being connected effectively to the low voltage side of said source of voltage, each of said second-tube collector electrodes being connected to one side of one of said capacitors, each but one of said second-tube dynode electrodes being connected to the other side of one of said capacitors, the arrangement being such that the flow of secondary electrons between the dynodes and the collector electrodes of said second tube will effectively connect said capacitors in series, a plurality of resistors, said resistors and said capacitors being connected in series (with one of said resistors being between each two of said capacitors), and means for supplying an alternating voltage to said first and said second tube control grids in phase opposition.

11. A voltage multiplier network comprising, a plurality of capacitors, a source of charging voltage for said capacitors, a parallel charging circuit for said capacitors, said charging circuit including a vacuum tube having (1) a cathode, (2) a control grid, (3) an accelerating grid, (4) a plurality of insulator-conductor elements adapted to be rendered conductive by bombardment with electrons from said cathode, and (5) a pair of contact electrodes for each of said elements, said electrodes making contact with the surface of said elements, one electrode, in each of said pairs of electrodes being connected to one side of one of said capacitors, the other electrode in alternate ones of said pairs of electrodes being connected to the high voltage side of said source of charging voltage and the other electrode in the remaining pairs of said electrodes being connected to the low voltage side of said source of charging voltage, a series discharging circuit for said capacitors, said series circuit including a second vacuum tube having (1) a cathode, (2) a control grid, (3) an accelerating grid, (4) a plurality of insulator-conductor elements adapted to be rendered conductive by bombardment with electrons from said second-tube cathode, and (5) a pair of contact electrodes for each of said second tube elements, one electrode in each of said pairs of second-tube electrodes being connected to one side of one of said capacitors, the other electrode in each but one of said pairs of second-tube electrodes being connected to the other side of one of said capacitors, the arrangement being such that said capacitors and said second-tube elements are connected in series through said second-tube electrodes, and means for supplying an alternating voltage to said control grids of said first and second tubes in phase opposition.

LAWRENCE J. GIACOLETTO.

No references cited.